United States Patent Office 3,468,832
Patented Sept. 23, 1969

3,468,832
STABLE AQUEOUS EMULSIONS
Eugene S. Barabas, Watchung, and Frederick Grosser, Midland Park, N.J., assignors to GAF Corporation, New York, N.Y., a corporation of Delaware
No Drawing. Filed Nov. 17, 1966, Ser. No. 595,028
Int. Cl. C08f 1/13, 19/00
U.S. Cl. 260—29.6                        3 Claims

ABSTRACT OF THE DISCLOSURE

Water-insoluble grafted terpolymers of a polymeric N-vinyl lactam such as polyvinyl pyrrolidone with ethylacrylate and acrylamide are prepared in an aqueous emulsion.

---

The present invention relates, in general, to stable aqueous emulsions and, in particular, to stable, aqueous emulsions comprising a grafted polymeric N-vinyl lactam containing ethylacrylate and acrylamide.

Grafted polymers comprising a basic homopolymer chain containing grafted thereon units or a plurality of such units of one or more polymerizable monomers, in chain form, grafted onto the basic homopolymer chain represent an interesting and important development in the resin arts, particularly since such grafted polymers find immediate and practical utility for the resin chemist to utilize them as "building block" resin systems or "module" resin systems which can be employed to "tailermake" subsequent resin systems to suit specific industrial needs. Grafted copolymers can be made by a variety of polymerization methods including solution, emulsion or bulk polymerization and the like. In the case of polymeric N-vinyl lactams, and particularly polyvinyl pyrrolidone (poly-1-vinyl-2-pyrrolidone), their use has been limited to a great extent to those fields of utility which take advantage of the inherent physical characteristics of polyvinyl pyrrolidone, the most important of which is its water solubility. While this physical characteristics of water solubility has projected polyvinyl pyrrolidone into a position of prominence for such industrial applications as pharmaceutical, cosmetic, textile, lithographic uses, it conversely precluded their use in industrial applications where water-insolubility of the resin system is a prerequisite.

Accordingly, it is an object of this invention to provide water-insoluble compositions based on polymeric N-vinyl lactams.

Another object of this invention resides in the provision of stable aqueous emulsions of N-vinyl lactams.

Yet another object of this invention resides in the provisions of stable aqueous emulsions comprising a grafted polymeric N-vinyl lactam containing ethylacrylate and acrylamide.

Still another object of this invention resides in the provision of stable aqueous emulsions comprising a grafted polymer of polyvinyl pyrrolidone containing ethylacrylate and acrylamide.

Still other objects of the inventions will become further apparent as the descripion of the invention proceeds.

In accordance with the above-defined objects, methods have been devised whereby stable aqueous emulsion latices are provided comprising N-vinyl lactam contaning ethylacrylate and acrylamide.

As a result of the invention upon which the present discovery is based, the latices of the present invention find immediate and practical applicability for use as cast films which are transparent, colorless and flexible. The films which are deposited are strong and clear and can be produced directly upon evaporation at room temperatures. Such materials are eminently useful as protective coatings, impregnants and permanent sizing agents for paper, leather and the like. Still other useful applications of the emulsions of the invention include their use as pastes or dispersions in hot dip coating, slush casting and cellular elastomer applications.

The polymeric N-vinyl lactams utilized in the preparation of the compositions of this invention are characterized by the following general structural formula:

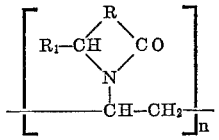

wherein R represents an alkylene bridge group necessary to complete a 5, 6 and 7-membered heterocyclic ring system, $R_1$ represents either hydrogen or an alkyl group, and $n$ represents a number indicative of the extent of polymerization.

All of the specific polymeric materials characterized by the foregoing general formula are commercially available and called polymeric N-vinyl lactams. They are obtained by polymerizing organic 5, 6 or 7-mentioned ring compounds containing in their rings the —NH—CO— group, such as, for example, 1-vinyl-2-pyrrolidone, 1-vinyl-5-methyl-2-pyrrolidone, 1-vinyl-2-piperidone, N-vinyl-ε-caprolactam, and the like. Depending upon the extent of polymerization, polymers having molecular weights ranging from at least 400 up to 2,000,000 or more may be produced. Viscosity measurements are commonly used as an indication of the average molecular weight of polymeric compositions, the instant polymers being characterized by a chain of carbon atoms to which the lactam rings are attached through their nitrogen atoms:

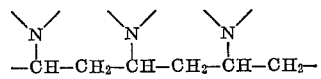

The K value (Fikentscher) of any particular mixture of polymers is calculated from viscosity data and is useful as an indication of the average molecular weight of such mixture. Its determination is fully described in "Modern Plastics," 23, No. 3, 157–61, 212, 214, 216, 218 (1945), and is defined as 1000 times $k$ in the empirical relative viscosity equation:

$$\frac{\log_{10} \eta_{rel}}{C} = \frac{75k^3}{1+1.5kc} + k$$

wherein C is the concentration in grams per hundred cc. of polymer solution and $\eta_{rel}$ is the ratio of the viscosity of the solution to that of pure solvent. The K values are reported as 1000 times the calculated viscosity coefficient in order to avoid the use of decimals. For the purpose of the present invention, there may be employed those polymeric N-vinyl lactams having a K value of about 10 to 200, preferably of 30 to 100 because of their viscosity at lower concentrations.

K values and specific viscosities ($\eta_{sp}$) are interconvertible and are related through relative viscosity ($\eta_{rel}$). Thus, when viscosity measurements are taken on solutions which have a concentration of 1.00 gram of polymer per deciliter of solution at 25° C. (C=1), the relationships are as follows:

$$\eta_{rel} = \eta_{sp} + 1$$

Relative viscosity=specific viscosity plus one.
Relative viscosity=

$$10[0.001K + 0.000075K^2/(1+0015K)]$$

Hence, $\eta_{sp}=$ $$-1 + 10[0.001K + 0.000075K^2/(1+0.0015K)]$$

Relative viscosity, specific viscosity and K are dimensionless, whereas inherent viscosity $$\frac{(\log_e \eta_{rel})}{C}$$

and intrinsic viscosity (the limit of inherent viscosity as C approaches zero) have the dimensions of dilution, i.e., the reciprocal of concentration. Intrinsic viscosity and K are intended to be independent of concentration.

The number of recurring polymer units enclosed by brackets in the foregoing general structural formula, indicated by "$n$," or the extent of degree of polymerization, corresponds to a chain of roughly 4 to 20,000 monomer units or more. In actual practice, a mixture of polymeric molecules, each containing a different number ($n$) of monomer units, is always produced. The polymers are readily prepared by the procedural steps given in United States Patents 2,265,450; 2,317,804; and 2,335,454 and in which working examples of all the species characterized by the above formula are given and all of which are incorporated herein by reference to said patents.

While not wishing to be bound by any particular theory or mechanism of reaction, it is believed that the arrangement of the monomeric units, that is, the ethylacrylate and acrylamide monomers is an essential part of the invention in relation to the polymeric N-vinyl lactam. With respect to the terpolymers of the present invention, the units of ethylacrylate and acrylamide are not situated in the main polymer chain but rather they form a more or less alternating side chain on the preformed polyvinyl pyrrolidone which forms the skeletal chain for the addition of the ethylacrylate and acrylamide units. The ratio of the polymeric N-vinyl lactam and the comonomers can be 10/90 to 99/1. The ratio of ethylacrylate and acrylamide can be 99/1 to 1/99.

For the preparation of the emulsions of our invention, the polymerizations must be carried out in aqueous dispersion, in the presence preferably of a water-soluble initiator such as potassium persulfate, ammonium persulfate or similar initiator and advantageously in the presence also of a surface-active agent. The preferred practice is to first prepare an aqueous solution containing the polymeric N-vinyl lactam, the initiator and the surface-active agent, heat the solution to the desired temperature, and then add the monomers in admixture dropwise to the reaction mixture, or add separately dropwise and at such rate that the respective monomers are completely added at the end of any stated time period. After completion of the addition of all of the monomers, the reaction mixture is then heated for a period up to several hours or more on a steam bath. The resulting stable emulsion contains the resinous interpolymers, above-defined, in the form of small particles or beads measuring in diameter about from 100 to 300 millimicrons. If desired, an activating agent such as an alkali metal sulfite or bisulfite, e.g., sodium, potassium, etc., sulfites and metabisulfites can be added to the polymerization reaction mixture in about the same amount as the polymerization initiator in which case lower polymerization temperatures may be used. Chain regulators such as hexyl, cetyl, dodecyl, myristyl, etc., mercaptans can also be employed in the polymerizations. Suitable surface-active agents include fatty acid soaps, fatty alcohol sulfates such as sodium lauryl sulfate, potassium lauryl sulfate, etc., alkali metal salts of aromatic sulfonic acids, e.g., sodium isobutylnaphthalene sulfonate, etc., phosphate esters of polyethoxy alkylphenols sulfosuccinic esters, -stearaminopropyl, dimethyl-hydroxyethyl ammonium chloride, and the like.

The emulsions can be compounded with additives such as pigments, salts, wetting agents, resins, waxes and the like, thus providing a wide spectrum of products having wide industrial application.

It has also been found that stable emulsions of the class described above can be prepared without the use of emulsifying agents or protective colloids, although it has been observed that it is preferable to add such materials to the emulsion recipe in order to obtain high conversion and greater stability of the resultant emulsions.

The following examples will serve to illustrate the practice of the invention:

EXAMPLE I

Into a four-necked, one liter resin kettle equipped with a mechanical stirrer, thermometer for liquid temperature, dropping funnel, reflux condenser, gas inlet tube and sampling tube were placed water, polyvinyl pyrrolidone, Duponol-Me (sodium lauryl sulfate), and ammonium persulfate in the amounts reflected in Table I (attached) and maintained at a temperature of 70° C. Subsequently ethylacrylate and acrylamide monomer were added dropwise over the time increments indicated in Table I, as well as subsequent additions of ammonium persulfate.

TABLE I

| Ingredients | Amount | | Seed., ml. | Ml. of ingredients added at Hours of Reaction | | | | | |
|---|---|---|---|---|---|---|---|---|---|
| | Gm. | Ml. | | 0 | 1 | 2 | 2½ | 3 | 3½ | 20 |
| Water | 476.0 | ³ 378.3 | 358.3 | 5.0 | | 5.0 | | 5.0 | 5.0 | |
| PVP/K-30, g | 60.0 | | 60.0 | | | | | | | |
| Acrylamide | 60.0 | ¹ 120.0 | | 40.0 | 10.0 | | 40.0 | | | |
| Ethylacrylate | 80.0 | 87.2 | | 29.1 | 29.1 | | 29.0 | | | |
| Duponol ME | 3.0 | ² 30.0 | | | | | | | | |
| (NH₄)₂S₂O₈ | 1.25 | ² 12.5 | 30.0 | 2.5 | | 2.5 | | 2.5 | 2.5 | |
| Temperature, ° C | | | | 25 | | 70 | | | | |

¹ 50% solution in water.
² 10% solution in water.
³ The amount of water used for making the solution is deducted.
Analytical results: Solids, percent=29.9; Conversion, percent=100.0; Brookfield visc. (cps.)=230,000.

It will be apparent that in place of the polyvinyl pyrrolidone having a potential K value of 30 employed in the foregoing examples, other polymeric N-vinyl lactams or polyvinyl pyrrolidone having other degrees of polymerization may be employed in practicing the present invention. We particularly prefer the commercially available polymers of N-vinyl-a-pyrrolidone having potential K values of from about K15 to K90 which corresponds to average molecular weights as determined by the Osmometric Method (H.P. Frank and G. B. Levy, J. Polymer Sci. 10, 371 (1953) of from about 10,000 in the case of PVB K15 to about 360,000 in the case of PVP K90, PVP K30 having an average molecular weight of about 40,000 and PVP K60 having an average molecular weight of about 160,000.

Reference in the specification and claims to parts, proportions and percentages, unless otherwise specified, refer to parts, proportions and percentages by weight.

Since it is obvious that numerous changes and modifications can be made in the above-described details without departing from the spirit and nature of the invention, it is to be understood that all such changes and modifications are included within the scope of the invention and that the invention is not limited to the exemplary details set forth by way of example, except as set forth

What is claimed is:

1. A stable emulsion comprising water and a graft terpolymer in which ethylacrylate and acrylamide comonomers are grafted onto a polymer of an N-vinyl lactam corresponding to the formula:

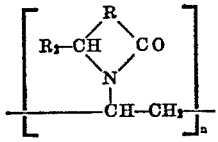

wherein R represents an alkylene bridge group containing from 2 through 4 carbon atoms, $R_1$ represents a member of the group consisting of hydrogen and alkyl and $n$ represents a positive integer selected from the group consisting of 4 through 20,000.

2. The emulsion of claim 1 the ratio of the polymeric N-vinyl lactam to the comonomers is 10/90 to 99/1.

3. The emulsion of claims 1 and 2 wherein the ratio of ethylacrylate to acrylamide is 99/1 to 1/99.

References Cited

UNITED STATES PATENTS

| | | | |
|---|---|---|---|
| 2,890,199 | 6/1959 | McNulty et al. | |
| 2,922,768 | 1/1960 | Mino et al. | 260—885 X |
| 3,097,185 | 7/1963 | Armen et al. | 260—875 X |
| 3,214,498 | 10/1965 | Bauer | 260—885 X |
| 3,244,658 | 4/1966 | Grosser et al. | |

MURRAY TILLMAN, Primary Examiner

H. ROBERTS, Assistant Examiner

U.S. Cl. X.R.

260—875, 885